Feb. 13, 1951 P. H. JONES 2,541,519
LIQUID SAMPLING APPARATUS WITH GAS TRAPS
Filed Sept. 1, 1949 2 Sheets-Sheet 2
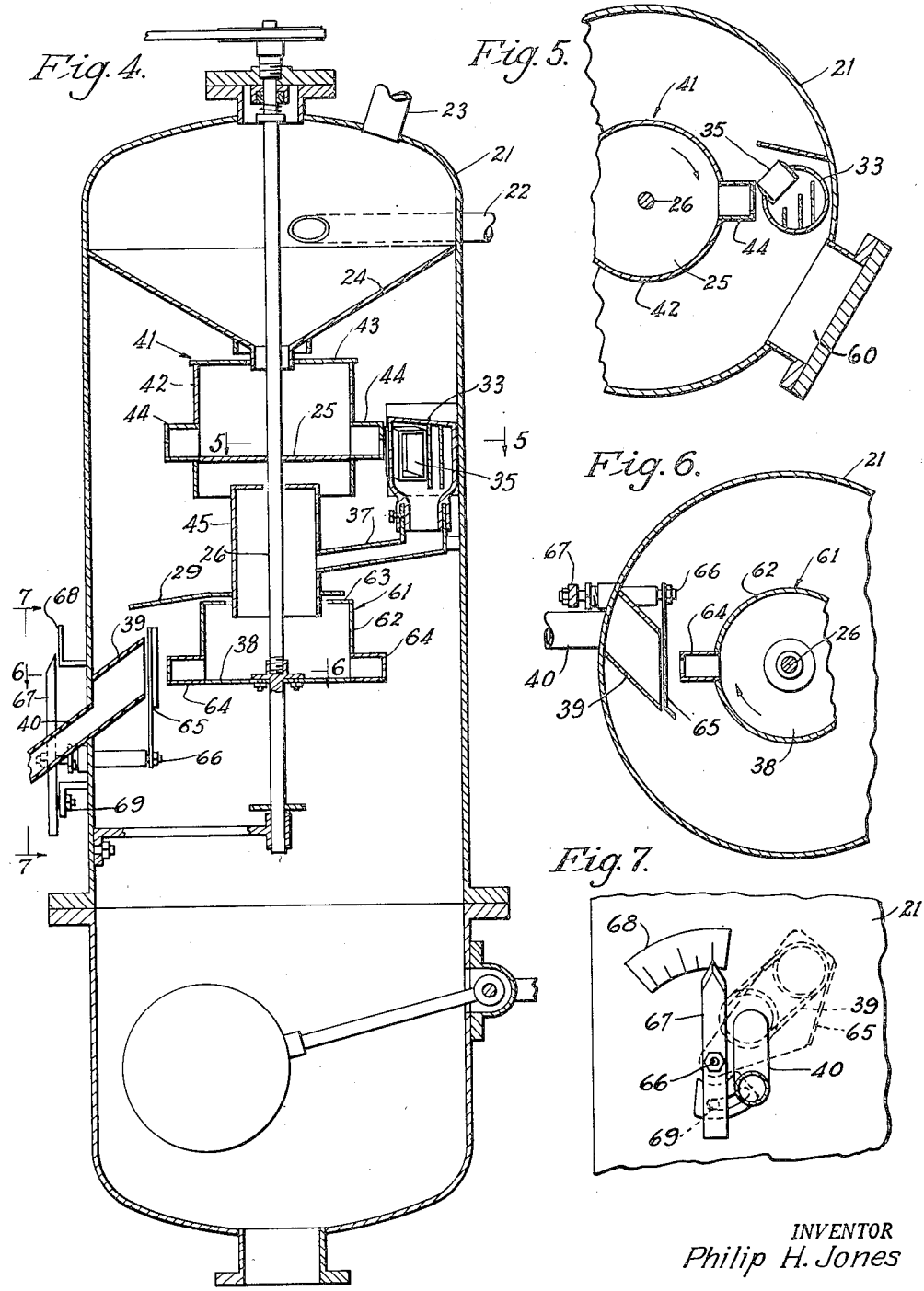
INVENTOR
Philip H. Jones
BY Milton W. Lee
AGENT Patented Feb. 13, 1951

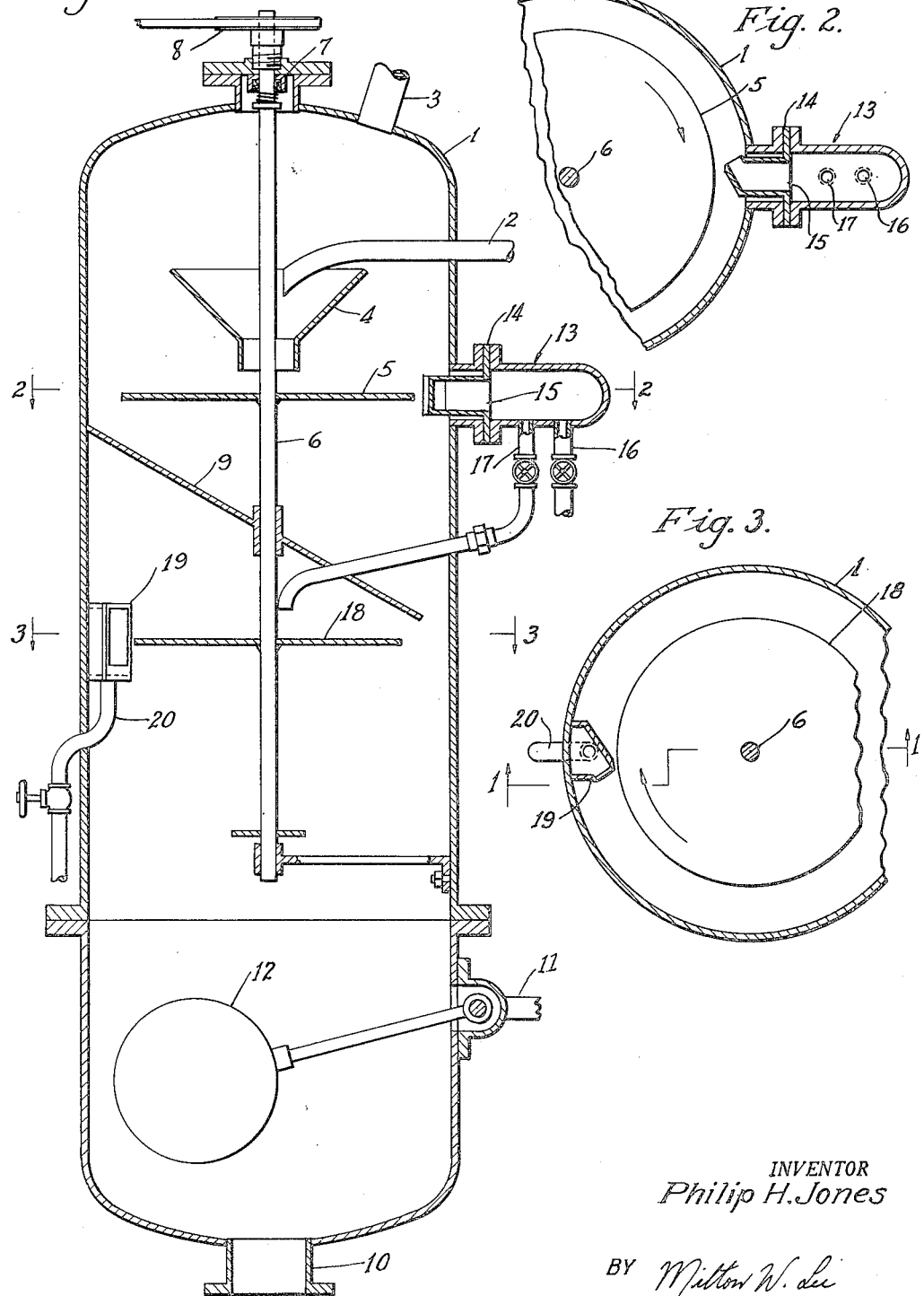

2,541,519

UNITED STATES PATENT OFFICE 2,541,519

LIQUID SAMPLING APPARATUS WITH GAS TRAP

Philip H. Jones, Los Angeles County, Calif.

Application September 1, 1949, Serial No. 113,655

12 Claims. (Cl. 73—421)

This invention relates to an apparatus for taking a representative sample of a stream of liquid for purposes of measurement and/or analysis. The apparatus may be used also for separating any gas accompanying the liquid, and the liquid may itself be composed of two or more immiscible liquids.

The apparatus of this invention may be used for any liquid, but is particularly suitable for measurement of production of oil wells. It is common practice now to produce a number of wells into a single battery of tanks. Gas traps may be used on each well, but the liquid production from each well is not ordinarily determined, only the total production from the group of wells producing into the battery of tanks.

It is an object of this invention to supply a device which is readily installed on an individual oil well to serve not only as a trap for separating gas from oil and water but also as a meter to measure the total liquid production from the well and as a sampler to obtain a representative portion of the liquid production for analysis. Other objects will appear from the description of the invention below.

Briefly the device of the present invention involves a vertical tank having a gas separation zone near the top and a liquid accumulation zone near the bottom. A shaft projects down through the approximate center of the top of the tank, and attached to the shaft are one or more spreading discs or chambers. The fluid to be measured is introduced into the gas separation zone and the gas is withdrawn from the top of the tank while the liquid drops onto the center of the spreading chamber or disc. The disc is revolved by means of the shaft at high speed, so that the liquid dropping on it is thrown outward toward the walls of the tank in a thin horizontal sheet. If a mixture of liquids is used, the rotation also insures thorough mixing so that the sheet thrown out has a uniform composition. A sample cutter is located near the wall of the tank and has a slot opening facing the rotating disc so that it intercepts a portion of the sheet of liquid thrown out. The proportion of the sheet of liquid which is trapped in the sample cutter is a definite function of the width of the slot opening in the sample cutter and the diameter of the disc of liquid at the point of interception by the sample cutter. The liquid trapped in the sample cutter may be withdrawn for measurement or analysis. Where the total liquid flow is large, it may be impractical to have a slot width sufficiently narrow to trap a conveniently small proportion of the total. In this case one or more additional spreading discs and sample cutters are employed in addition to the one just described. The liquid trapped in the first sample cutter is allowed to flow by gravity onto the center of a second rotating spreading disc attached to the same shaft as the first and suitably shielded to prevent entry of any other liquid. The liquid so dropped on the second disc is also thrown out in a horizontal sheet, and a portion of this is trapped in the second sample cutter in the same manner. The sample trapped in the second cutter is then withdrawn for analysis or measurement, or is passed onto a third rotating disc if desired.

The invention will be made more clear by reference to the attached drawings in which—

Figure 1 shows a device of this invention employing two rotating discs and two different types of sample cutters.

Figure 2 is a sectional view through the upper sample cutter of Figure 1.

Figure 3 is a sectional view through the lower sample cutter of Figure 1.

Figure 4 shows another device of this invention employing two rotating discs and sample cutters and illustrates modifications which may be made in the apparatus of Figure 1.

Figure 5 is a sectional view through the upper sample cutter of Figure 4.

Figure 6 is a sectional view through the lower sample cutter of Figure 4.

Figure 7 is an elevation of the outside of the tank facing the lower sample cutter of Figure 4.

Referring now to Figure 1, a mixture of gas and liquid oil and water is introduced into tank 1 through line 2. In the upper part of the tank the gas separates from the liquid and is withdrawn through line 3. The liquid all passes through funnel 4 and falls on the center of upper spreading disc 5. This disc is attached to shaft 6 which passes out the top of tank 1 through gland 7 and is rotated at a high rate of speed by motor-driven pulley 8. The liquid falling on rotating disc 5 is thrown out to the walls of tank 1 in a thin uniform sheet. The main body of the liquid falls from the walls of the tank down across baffle 9 to the lower part of the tank, where it is drawn off through line 10. To maintain a constant liquid level in the lower part of the tank, float 12 may be employed, with an extension 11, for regulating a valve in line 10 in the conventional manner.

Although the main body of liquid thrown from disc 5 is thus by-passed to the bottom of the tank, a small portion is trapped in upper sample cutter 13. This sample cutter is made in the form of a pipe projecting longitudinally from the tank, the pipe being closed at its outer end and having near its inner end a flange for insertion of a plate 14 with orifice 15. The orifice is placed directly in line with the sheet of liquid thrown from disc 5, and the amount of liquid passing through the orifice and trapped behind it depends on its width as explained below. At the bottom of the sample cutter beyond the orifice are lines 16 and 17, each equipped with valves. If the proportion of the freed liquid trapped in the sample cutter 13 is of the desired magnitude, the valve in line 17 is closed and the valve in line 16 is opened to discharge the trapped sample for measurement and/or analysis. If too large a proportion of the feed liquid is being trapped in sample cutter 13, the valve in line 16 is kept closed and the valve in line 17 is opened to discharge the first trapped sample on to the center of lower spreading disc 18. The latter disc is shielded by baffle 9 to prevent any liquid from falling on it other than that delivered from the upper sample cutter 13 through line 17. Lower spreading disc 18 is attached to shaft 6 also, and its rotation causes the liquid dropped on it to be thrown out to the walls of the tank in a uniform thin sheet. The bulk of this liquid merely falls to the bottom of the tank for withdrawal, but a portion of it is trapped in lower sample cutter 19 and is withdrawn for measurement and/or analysis through line 20. A bearing may be used near the lower end of shaft 6 as illustrated to provide rigidity.

Figures 2 and 3 show details of the sample cutters 13 and 19 respectively, and the same numbers are used to designate the parts as were used in the above description of Figure 1. It will be observed that the orifice of cutter 13 may be readily replaced with an orifice of different size without entering the tank, whereas the orifice of cutter 19 is fixed (though it may be made adjustable if desired, and a hand-hole may be provided in the wall of the tank to permit adjustment or replacement). Either of these two cutters may be used in both places, if desired, or either of the cutters of Figures 4, 5, 6 and 7 may be used in place of either or both of the above cutters.

Figure 4 illustrates a number of modifications, any of which may be substituted in the apparatus of Figure 1. The feed mixture is introduced into tank 21 through line 22, which preferably enters tangentially as shown. The feed gas separates and is withdrawn through line 23, while the feed liquid passes down through funnel 24, which here extends to the walls of the tank, and falls on the center of upper spreading disc 25. This forms the lower surface of rotating spreading chamber 41 which has walls 42 which may be in the form of a vertical pipe partly closed at the top by plate 43. Chamber 41 is closed at the bottom except for discharge pipes 44 through which the feed liquid is thrown out to the walls of the tank in the form of a number of small uniform streams forming a substantially continuous sheet.

The main body of liquid thrown from the upper spreading chamber 41 falls to the bottom of the tank for withdrawal while being prevented from entering any lower spreading chamber or sample cutter by baffles such as 29. A portion of the liquid thrown from chamber 41 however, is trapped in upper sample cutter 33. This sample cutter is made in the form of a chamber having an orifice slot 35 of fixed width but being rotatable on its base so that the proportion of the slot width exposed to the liquid sheet thrown from chamber 41 is variable. Cutter 33 has splash baffles as illustrated. The adjustment of the position of the slot may be made through a hand hole in the tank, not shown in Figure 4 but shown as 60 in Figure 5. The entire cutter assembly 33 may also be replaced by a similar assembly having a wider or narrower slot 35 as desired.

The liquid trapped in cutter 33 is passed from its base through lines 37 and 45 to fall on the center of lower spreading disc 38 which forms the lower surface of a lower spreading chamber 61. Chamber 61 is like upper chamber 41 and has wells 62, a plate 63 partially closing the top, and discharge pipes 64. It is desirable to extend the upper end of line 45 upward around shaft 26 and extend pipe 42 downward to above the top of line 45 to prevent entry into chamber 61 of any liquid not passing through line 37 and cutter 33.

The liquid entering rotating chamber 61 is thrown out through pipes 64, and the bulk of it falls from the walls to the bottom of the tank while a representative sample is trapped in lower sample cutter 39 and is withdrawn for measurement or analysis through line 40, which is ordinarily equipped at its outer end with a valve, not shown.

Figure 5 shows additional details of sample cutter 33, and Figures 6 and 7 show additional details of sample cutter 39. The latter is designed so that the effective width of the slot through which the liquid enters may be varied from outside the tank. Thus a shield 65 is provided which is rotatable about shaft 66 so as to cover any desired proportion of the inlet end of line 40. A pointer 67 is attached to the outer end of shaft 66 to show the position of shield 65. A scale 68 may be placed behind the pointer for convenience, and a lock nut 69 may be used to hold it in place when not being adjusted. A hand-hole 60 shown in Figure 5 is the hand-hole referred to in the above description of Figure 4, for adjusting the slot position of sample cutter 33. A similar hand-pole may be used for sample cutter 19 of Figure 1 as described above.

The rotation of the spreaders need be sufficiently rapid merely to throw the liquid into the sample cutters. A representative sample will ordinarily be obtained even at relatively low speeds because of the frequency of sampling. For example at 175 R. P. M., using two orifices 44 as in Figure 4, the entire stream is being sampled 350 times per minute. In general speeds above about 60 R. P. M. will be satisfactory for the purposes of this invention.

It is desirable for greatest accuracy of course, that the stream leaving the spreader in every direction at any given instant be uniform as to amount and also as to composition. In this way the proportion of material trapped in the sample cutters will be exactly proportional to the width of the orifice slot as compared with the circumference of the stream being thrown from the disc at this point; and the composition of the material trapped in the sample cutters will be exactly the same as the composition of the material which is not trapped in the cutters. To accomplish this purpose, it is desirable that the spreader discs be substantially horizontal and that the feed mixture be dropped very close to the middle of the spreader disc or relatively uniformly about the middle. Higher speeds of rotation in general also assure greater uniformity of distribution, but excessive speeds are to be avoided where the feed contains immiscible liquids because of the possibility of obtaining undesired emulsions. Of course if emulsions are desired, the higher speed is preferable.

In the case of the sample chamber design of Figure 4, the above considerations of speed, horizontal surface, and feeding at the middle of the spreader are of much less importance than with the sample disc of Figure 1. Thus with the design of Figure 4, the entire stream must pass out of the orifices, and substantial uniformity of composition is assured regardless of high speed, exactly horizontal surface or feeding very close to the middle of the spreader. As indicated above, so many samples are taken per minute that substantial uniformity is assured.

The funnel means such as 4, 24 or 45 for dropping the liquid on the central portion of the spreaders must be sufficiently small at its lower end to assure dropping the liquid near the center of the spreader, but it must also be sufficiently large to accommodate the maximum flow of liquid feed to the spreader. If the design of funnel 24 of Figure 4 is used, it must also be sufficiently large at its minimum cross section to accommodate not only all the down-flowing liquid but also the up-flow of any gas separated below the funnel.

Although a flat disc is preferred as the bottom of the spreading chamber or as the spreading disc, one which is concave upward, i. e., cup or funnel shaped, or one which is concave downward or cone shaped may be used. The design and speed of rotation must be such however, as to throw out from the periphery of the disc a relatively thin sheet so that an entire segment of it may be caught in the sample cutter. The sample chamber design of Figure 4 is preferred to the simple disc of Figure 1, and as many discharge tubes 44 as desired may be used, though at least two are preferred to one. If desired, orifices or other constrictions may be employed at the ends of outlet tubes or pipes 44 so as to provide a thin sheet of discharged liquid. These orifices or constrictions must be sufficiently large however to allow free passage of the maximum flow of liquids to be measured, since the spreading chambers must not be allowed to overflow, and preferably should not be filled to any substantial extent where two immiscible liquids are employed, lest some stratification occur.

As previously stated, the proportion of the liquid fed to each spreader which is trapped in the corresponding sample cutter depends on the width of the slot. Actually the proportion is the ratio of the arc cut by the slot to the circumference of a circle having a radius equal to the distance from the center of the spreader to the edge of the slot; but for small arcs, the arc is substantially the same as the width of the slot.

Obviously data covering the geometry of the apparatus (relations of the number of sample cutters and slot widths and diameters and numbers of sheets of liquid being intercepted by cutters) the time of taking a sample and the size of sample recovered can be used to determine the volume of the liquid stream that passes through the meter and sampler in any given time. The apparatus should be designed to provide a sample that is of convenient size for measuring and analysis.

As a specific example, a combination sampler, trap, and meter of this invention may be made in approximately the relative proportions shown in Figure 4, using a spreader having a diameter at the tips of pipes 44 of 11¾ inches, and a sample cutter with a slot seven inches from the center of the spreader, providing a diameter of intercepted liquid sheet of 14 inches. For an average petroleum, a speed of 175 R. P. M. is suitable for this spreader. In the following table there are shown a number of typical slot widths for one, two, or three-spreader units of this design, and the corresponding liquid throughput which will result in obtaining a sample of about one gallon per day.

| Slot Width, Inches | | | Entire Throughput, Bbl./Day | Sample Per Cent by vol. of Throughput | Approximate Vol. of Sample, Gal./Day |
|---|---|---|---|---|---|
| *Single-Spreader Unit* | | | | | |
| 1 | | | 1 | 2.27 | 1 |
| 0.1 | | | 10 | 0.227 | 1 |
| *Two-Spreader Unit* | | | | | |
| Upper | Lower | | | | |
| 2 | 2 | | 10 | 0.206 | 0.9 |
| 2 | 1 | | 20 | 0.103 | 0.9 |
| 1 | 1 | | 40 | 0.0515 | 0.9 |
| 1 | 0.5 | | 80 | 0.0258 | 0.9 |
| 0.5 | 0.5 | | 160 | 0.0129 | 0.9 |
| 0.5 | 0.35 | | 320 | 0.00903 | 1.2 |
| 0.35 | 0.35 | | 500 | 0.00633 | 1.3 |
| *Three-Spreader Unit* | | | | | |
| Upper | Middle | Lower | | | |
| 2 | 2 | 2 | 100 | 0.00935 | 0.9 |
| 1 | 1 | 1 | 1,000 | 0.00117 | 1.2 |
| 0.5 | 0.5 | 0.5 | 6,000 | 0.000144 | 0.9 |

It is clear that the above example is only illustrative. Other sizes of equipment and different slot widths, sizes of samples, etc. may be used. Other liquids may also be measured, such as water, solvents, etc. Where inflammable liquids or vapors or gases are used it is desirable to operate under pressure. For this purpose valves may be provided in all the outlet lines, and a pump on the inlet line if necessary. For automatic pressure regulation the gas outlet line valve may be automatically controlled by conventional means.

The apparatus is indicated in the drawing in the schematic form, and details of the construction are not necessarily shown. Thus the sample cutters or the orifices or the orifice plate 14 may be made replaceable with other sample cutters, orifices or orifice plates of different sizes or designs. For example, orifice plate 14 could be a flat disc with a slot therein. The orifice plate 14 or the orifices in 19, 33 or 39 may be placed so as to face in any direction which will permit liquid from the spreader discs to enter. However the liquid will normally be thrown from the disc tangentially, so that it is desirable to place the orifices so that they are perpendicular to the tangential flow from the spreading discs as indicated. This permits more accurate calculation and measurement of the flow.

While the above discussion has been concerned with feed streams containing only liquids and gases, it is clear that the same principles apply to feed streams containing suspended solids. The samples obtained will be of representative composition with respect to all of the liquids and solids present in the feed stream.

If the liquid stream being measured and sampled contains no dissolved or entrained gas it may be desirable to add gas to the apparatus to maintain a gas space to a point below the lowest cutters and spreader in the apparatus. This can be accomplished by admitting to the apparatus a small amount of gas, such as carbon dioxide or nitrogen that is not appreciably soluble in or deleterious to the liquid or liquids being measured and sampled, and withdrawing the gas at the top of the apparatus through a pressure relief valve set to hold the pressure below that of the inlet liquid and above that required to discharge the liquid through the float controlled valve in the outlet line from the base of the apparatus.

A sampling bomb may be connected to the outlet of the last sample cutter to collect the sample for analysis or measurement. For pressure operation, it may be desirable to have provision for a pressure equalizing line from the vapor space of the sample bomb to the vapor space or gas outlet line of the tank. Provision may also be made for a liquid sample collecting chamber inside the tank, which can be merely drained at sampling time. Thus for example, line 29 of Figure 1 may lead to a sampling chamber within the lower part of tank suitably shielded to prevent entry of other liquid, and a draw-off line from the bottom of this sampling chamber may lead to the outside of the tank. A valve in line 20 operable from outside the tank may or may not be employed, as desired. If one is provided, it may be closed at the exact end of the sampling period, to provide better accuracy of timing. A gage glass may be used on the sampling chamber to show how much liquid it contains at any time. This may be done whether the sampling chamber or bomb is inside or outside the tank, although in the former case of course the gage glass must be made visible from outside the tank. A line and valve from the bottom of the sampling chamber or bomb to the liquid collecting zone in the bottom of the tank in either case, provide for draining undesired samples back into the main stream of liquid in the bottom of the tank.

Means may also be provided for automatically recording the rate at which the sampled stream was flowing. For example a clock mechanism could start moving a pointer at the start of any given sampling period. The pointer would move over a scale showing rate in barrels per day or in some other units and a float in the sample container would start the clock mechanism and also stop it when a given volume of sample was recovered. The relations between the scale, the time to collect the sample and the geometry of the apparatus and also the volume of sample taken would be such that when the pointer was stopped it would point to the correct rate on the scale.

In another modification of the present invention a disc need not be employed as the spreading means, but one or more nozzles may be employed in place thereof. Thus a simple central downpipe from funnel 4 or 24 leading into a horizontal pipe open at each end could be used in place of spreader 5 or 25. Preferably the dimensions should be sufficient so that the horizontal pipe or nozzles would never be completely filled with liquid.

Other modifications of the invention which would be apparent to one skilled in the art are to be included in the scope of the following claims.

I claim:

1. An apparatus for obtaining a sample of the liquid contained in a feed mixture of liquid and gas which comprises a vertical tank, a horizontal spreading disc in the middle portion thereof, a gas separation zone at the top of said tank, means for introducing said feed mixture into said gas separation zone, means for withdrawing separated gas from the top of said separation zone, funnel means for directing separated liquid from said gas separation zone to the central portion of said spreading disc, means for rotating said disc horizontally about its center so as to throw said liquid outward therefrom in a substantially horizontal thin sheet, a sample cutter near the wall of said tank and having a slot facing said spreading disc so as to intercept a portion of the liquid thrown out therefrom, means for withdrawing the intercepted portion of the liquid from said sample cutter, and means for withdrawing the non-intercepted portion of the liquid from the bottom of said tank.

2. An apparatus according to claim 1 in which there is a second rotating horizontal spreading disc in the middle portion of the vertical tank below the first spreading disc, a second sample cutter with a slot facing said second spreading disc, means for transferring the liquid intercepted by the first sample cutter to the central portion of the second spreading disc, and means for withdrawing the liquid intercepted by the second sample cutter from the tank.

3. An apparatus according to claim 1 in which the sample cutter comprises a horizontal chamber located outside the tank and closed at its outer end and opening at its inner end into said tank, and said chamber is further provided with an orifice plate near the inner end thereof.

4. An apparatus according to claim 1 in which the sample cutter comprises a chamber within said tank, the slot is located above the bottom of said chamber, and the means for withdrawing the intercepted liquid comprises a pipe leading outside said tank.

5. An apparatus according to claim 4 in which means are provided for rotating the sample cutter chamber so as to effectively vary the width of the slot facing the spreading disc.

6. An apparatus according to claim 1 in which the sample cutter slot width is made variable by providing a large opening at the inner end of the sample cutter facing the spreading disc, and a shield adapted to cover said opening, and means for adjusting the position of said shield from the outside of said tank so as to cover the desired portion of said opening.

7. An apparatus according to claim 1 further provided with a spreading chamber having said disc as its bottom, walls adapted to prevent entry of any liquid except that introduced on to the central portion of the disc, and at least one pipe projecting from the periphery of the disc for discharge of the liquid therefrom.

8. An apparatus according to claim 1 in which there is a sampling chamber located within said tank, means for introducing the liquid intercepted by said sample cutter into said sampling chamber, and means for withdrawing the liquid from said sampling chamber outside the tank.

9. A combination meter, trap and sampler for a mixture of oil, gas, and water, which comprises a vertical tank containing a vertical central shaft, means for rotating said shaft, at least two horizontal spreading discs attached to said shaft at different elevations, means for maintaining a liquid level near the bottom of said tank by withdrawal of liquid therefrom, means for introducing said mixture of oil, gas and water near the top of said tank, means for withdrawing gas from the top of said tank, funnel means for directing all of the liquid introduced to the center of the uppermost spreading disc so that it may be centrifugally thrown out therefrom to the walls of the tank, an uppermost sample cutter chamber near said wall having a slot adapted to receive all of the liquid so thrown from said uppermost spreading disc over an area of the width of the slot; baffle means for permitting all the remainder of the liquid to fall to the bottom of the tank while preventing such liquid from entering any of the lower spreading discs, means for transferring the liquid trapped in said upper sample cutter to the center of a lower rotating spreading disc, a lowermost sample cutter chamber near said wall having a slot adapted to receive all of the liquid thrown from the lowermost spreading disc over an area of the width of its slot, and means for withdrawing the so intercepted liquid from the tank.

10. An apparatus according to claim 9 further provided with at least one spreading chamber having one of said discs as its bottom, walls adapted to prevent entry of any liquid except that introduced on to the central portion of the disc, and at least one pipe projecting from the periphery of the disc for discharge of the liquid therefrom.

11. An apparatus for obtaining a sample of the liquid contained in a feed mixture of liquid and gas which comprises a vertical tank, horizontal spreading means in the middle portion thereof, a gas separation zone at the top of said tank, means for introducing said feed mixture into said gas separation zone, means for withdrawing separated gas from the top of said separation zone, funnel means for directing separated liquid from said gas separation zone to the central portion of said spreading means, means for rotating said spreading means horizontally about its center so as to throw said liquid outward therefrom in a substantially horizontal thin sheet, a sample cutter near the wall of said tank, a slot in said sample cutter facing said spreading means so as to intercept a portion of the liquid thrown out therefrom, means for withdrawing the intercepted portion of the liquid from said sample cutter, and means for withdrawing the non-intercepted portion of the liquid from the bottom of said tank.

12. An apparatus according to claim 11 in which the spreading means comprises at least one rotating nozzle.

PHILIP H. JONES.

REFERENCES CITED

The following references are of record in the file of this patent:

UNITED STATES PATENTS

| Number | Name | Date |
| --- | --- | --- |
| 1,020,251 | Behr et al. | Mar. 12, 1912 |
| 1,215,988 | Pott | Feb. 13, 1917 |
| 1,488,356 | Linke | Mar. 25, 1924 |
| 1,725,226 | Taylor | Aug. 20, 1929 |
| 2,379,921 | Pizzirani et al. | July 10, 1945 |
| 2,392,231 | Cooper | Jan. 1, 1946 |